Patented Jan. 13, 1953

2,625,564

UNITED STATES PATENT OFFICE 2,625,564

RESOLUTION OF ISOAMIDONE WITH (L+)-p-NITROBENZOYL-GLUTAMIC ACID

Meyer Sletzinger, Forest Hills, N. Y., and Max Tishler, Westfield, N. J., assignors to Merck & Co., Inc., Rahway, N. J., a corporation of New Jersey No Drawing. Original application June 19, 1948, Serial No. 34,154. Divided and this application December 26, 1951, Serial No. 263,474

4 Claims. (Cl. 260—501)

This invention is concerned with the resolution of dl-isoamidone into its individual stereoisomers; more particularly it relates to a novel process for preparing l-isoamidone in pure form and in excellent yield from the corresponding racemate.

This application is a division of our co-pending application, Serial No. 34,154, filed June 19, 1948.

dl-Isoamidone, which can be prepared as described in our co-pending application, Serial No. 756,320, filed June 21, 1947, and now Patent No. 2,538,130, issued January 16, 1951, has the chemical name 1-dimethyl-amino-2-methyl-3,3-diphenyl-hexanone-4 and the structural formula:

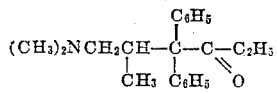

This compound is useful as an analgesic and as a morphine substitute. The toxicity of dl-isoamidone, however presents a problem in the use and administration of the drug. Since the active isomer is the l-form, it is desirable to obtain l-isoamidone as the pure isomer. When l-isoamidone is substituted for the dl-mixture, the dosage required to produce a given analgesic effect is then reduced to one-half, with a proportional decraese in the toxic effect of the drug.

It is now discovered that the resolution of dl-isoamidone into its individual stereoisomers can be acomplished by treating said dl-isoamidone with (L+)p-nitrobenzoyl-glutamic acid to form the corresponding salts of d- and l-isoamidone, separating said isomeric salts and recovering d- and l-isoamidone. This mixture of salt is conveniently prepared by reacting the dl-isoamidone and the (L+)p-nitrobenzoyl-glutamic acid in solution in a lower aliphatic alcohol, such as methanol, ethanol, isopropanol, butanol, and the like.

It is ordinarily preferred to carry out this reaction by dissolving the dl-isoamidone and the (L+)p-nitrobenzoyl-glutamic acid in hot isopropanol. Upon cooling this solution the (L+)p-nitrobenzoyl-glutamic acid salt of (d)-isoamidone precipitates and is removed by filtration. The resulting mother liquor and washes, which contain the (L+)p-nitrobenzoyl-glutamic acid salt of (l)-isoamidone are evaporated and treated with an aqueous solution of a strong inorganic base such as aqueous sodium hydroxide, aqueous potassium hydroxide, aqueous ammonium hydroxide, and the like, thereby liberating (l)-isoamidone base. The l-isoamidone is conveniently recovered from the aqueous alkaline mixture by extraction with a water-immiscible solvent, such as chloroform, carbon tetrachloride, benzene, toluene, petroleum ether, ethylene dichloride, and the like, followed by evaporation of said non-aqueous solvent to produce l-isoamidone. The l-isoamidone, which is ordinarily obtained as an oily solid, is treated with an alcoholic solution of hydrogen chloride, preferably an isopropanol solution of hydrogen chloride, to produce l-isoamidone hydrochloride monohydrate.

The (L+)p-nitrobenzoyl-glutamic acid salt of (d)-isoamidone can likewise be converted to the corresponding (d)-isoamidone hydrochloride monohydrate employing substantially the same procedure described above for converting the laevorotatory isomer.

The monohydrates of l- and d-isoamidone hydrochloride can be converted, if desired, to the corresponding l- and d-isoamidone hydrochlorides by heating said monohydrates at 100° C. and 1 mm. pressure for about 10 hours.

The following example illustrates a method of carrying out the present invention, but it is to be understood that this example is given for purposes of illustration and not of limitation.

Example

One-hundred and fifty grams of dl-isoamidone and 59.5 g. of (L+)p-nitrobenzoyl-glutamic acid were dissolved in 595 cc. of boiling isopropanol. The hot solution was filtered to remove any insoluble material, and the clear solution was then allowed to cool. The resulting mixture was stirred for 1.5 hours, during which time the temperature was allowed to drop to 30° C. At the end of this time a copious precipitate had formed. This precipitate was removed by filtration, washed with 20 cc. of cold isopropanol and finally with ether. This product was dried to produce 73 g. of the crude (L+)p-nitrobenzoyl-glutamic acid salt of (d)-isoamidone; $[\alpha]_D^{25} = +49.3°$ (1% solution in methanol); M. P. 168–171° C. (A sample of this material, after recrystallization from methanol, showed an $[\alpha]_D^{25} = +60°$; M. P. 171–172° C.)

The mother liquor from the crude (L+)p-nitrobenzoyl-glutamic acid salt of (d)-isoamidone had an optical rotation of −1.65. This mother liquor was combined with the isopropanol and other washes and evaporated in vacuo in the steam bath. The residual (L+)p-nitrobenzoyl-glutamic acid salt of (l)-isoamidone was stirred with a mixture of 212 cc. of water, 140 cc. of chloroform and 140 cc. of 30% aqueous sodium hydroxide for one hour. At the end of this time the chloroform layer was separated and the aqueous layers extracted with three 100 cc. portions of chloroform. The chloroform extracts were combined, dried over anhydrous sodium sulfate, filtered and evaporated to dryness in vacuo on the steam bath. The oily residue of l-isoamidone base was dissolved in 70 cc. of isopropanol and rendered acidic with 70 cc. of a 4.9 N solution of hydrogen chloride in isopropanol. One liter of U. S. P. ether was added, whereupon a precipitate soon appeared and the mixture was allowed to stand at 25–30° C. for 20 minutes. The precipitated material was recovered by filtration and dried to produce 31 g. of l-isoamidone hydrochloride monohydrate; $[\alpha]_D^{25} = -90°$ (1% solution in methanol); M. P. = 170–172° C.

This product was recrystallized by dissolving in 80 cc. of hot isopropanol and the hot isopropanol solution was filtered from any insoluble matter. Three hundred and twenty-five cc. of U. S. P. ether was added to the isopropanol filtrate and the resulting mixture was allowed to stand at 25–30° C. for twenty minutes. The precipitated material was removed by filtration, washed with ether and dried at 30° C. to produce 26.5 g. of substantially pure l-isoamidone hydrochloride monohydrate; $[\alpha]_D^{25} = -90°$ (1% solution in methanol); M. P. = 173–174° C.; yield equals approximately 42.6% of theory. Anal. calc'd for $C_{21}H_{28}ONCl \cdot H_2O$: C, 69.28; H, 8.31; N, 3.84. Found: C, 69.52; H, 8.08; N, 3.91.

In order to isolate d-isoamidone hydrochloride monohydrate, 73 g. of the (L+)p-nitrobenzoyl-glutamic acid salt of (d)-isoamidone, prepared as described above (having an $[\alpha]_D^{25} = -49.3°$)

was dissolved in 74 cc. of water, and 44 cc. of chloroform was then added. One hundred and thirty cc. of 30% aqueous sodium hydroxide solution was added to this mixture, with stirring, and the stirring was continued for 15 minutes. The bottom chloroform layer was then separated and the aqueous layer extracted with three 30 cc. portions of chloroform. The chloroform layers were combined, dried over anhydrous sodium sulfate, filtered and evaporated to dryness.

The oily residue of d-isoamidone base thus produced was dissolved in 32.5 cc. of isopropanol and rendered acidic with 32.5 cc. of a 4.9 N isopropanol solution of hydrogen chloride. Two hundred and fifty-six cc. of U. S. P. ether was added whereupon a copious white precipitate separated; the mixture was allowed to stand for twenty minutes and filtered. The precipitate was washed with 50 cc. of a 1:8 isopropanol-ether mixture and dried at room temperature to produce 24 g. of d-isoamidone hydrochloride monohydrate; M. P. 173–174° C.; $[\alpha]_D^{25} = +90°$ (1% solution in methanol); yield 38.9% of theory. Anal. calc'd for $C_{21}H_{28}ONCl \cdot H_2O$: C, 69.28; H, 8.31; N, 3.84. Found: C, 69.55; H, 8.28; N, 4.03.

Various changes and modifications may be made in carrying out the present invention without departing from the spirit and scope thereof. Insofar as these changes and modifications are within the purview of the annexed claims, they are to be considered as part of our invention.

We claim:

1. The process of preparing l-isoamidone and acid salts thereof which comprises treating a mixture containing the laevorotatory and dextrorotatory isomers of isoamidone with (L+)p-nitrobenzoyl-glutamic acid in solution in a lower alkanol, recovering the precipitated salt of d-isoamidone, evaporating the mother liquor and treating the residual (L+)p-nitrobenzoyl-glutamic acid salt of l-isoamidone with an aqueous solution of a strong inorganic base thereby forming l-isoamidone base, treating said l-isoamidone base with a lower alkanol solution of hydrogen chloride followed by ether, recovering the precipitated l-isoamidone hydrochloride monohydrate, and drying this monohydrate at a temperature of about 100° C. at a pressure of about 1 mm. to produce l-isoamidone hydrochloride.

2. In the process of preparing l-isoamidone and acid salts thereof from a mixture containing the laevorotatory and dextrorotatory isomers of isoamidone, the steps which comprise treating said mixture containing the laevorotatory and dextrorotatory isomers of isoamidone with (L+)p-nitrobenzoyl-glutamic acid in solution in a lower alkanol, and recovering the precipitated salt of d-isoamidone, thereby producing a mother liquor containing the (L+)p-nitrobenzoyl-glutamic acid salt of l-isoamidone.

3. In the process of resolving dl-isoamidone to produce l-isoamidone and acid salts thereof, the steps which comprise treating said dl-isoamidone with (L+)p-nitrobenzoyl-glutamic acid in isopropanol solution, and recovering the precipitated salt of d-isoamidone, thereby forming a mother liquor containing the (L+)p-nitrobenzoyl-glutamic acid salt of l-isoamidone.

4. (L+)p-nitrobenzoyl-glutamic acid salt of l-isoamidone.

MEYER SLETZINGER.
MAX TISHLER.

No references cited.